(12) United States Patent
Ryu

(10) Patent No.: US 7,452,102 B2
(45) Date of Patent: Nov. 18, 2008

(54) LAMP HOLDER, LAMP ASSEMBLY HAVING THE SAME, BACKLIGHT ASSEMBLY HAVING THE SAME AND DISPLAY DEVICE HAVING THE SAME

(75) Inventor: Ho-Han Ryu, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 149 days.

(21) Appl. No.: 11/414,924

(22) Filed: May 1, 2006

(65) Prior Publication Data

US 2007/0030663 A1    Feb. 8, 2007

(30) Foreign Application Priority Data

Aug. 8, 2005    (KR) .................... 10-2005-0072246

(51) Int. Cl.
*F21S 4/00* (2006.01)
(52) U.S. Cl. .................... 362/225; 362/220; 349/58
(58) Field of Classification Search ............. 362/225, 362/220, 260, 561, 95; 349/58–60, 70
See application file for complete search history.

(56) References Cited

U.S. PATENT DOCUMENTS

| | | | | |
|---|---|---|---|---|
| 2,288,376 A | * | 6/1942 | Tuppen .................... 315/326 |
| 2,393,616 A | * | 1/1946 | De Reamer et al. ......... 439/243 |
| 2,399,531 A | * | 4/1946 | Young ........................ 439/234 |
| 4,435,744 A | * | 3/1984 | Russo ........................ 362/219 |
| 5,037,309 A | * | 8/1991 | Abe et al. ..................... 439/56 |
| 6,722,773 B2 | * | 4/2004 | Tsai et al. .................... 362/216 |
| 6,769,789 B1 | * | 8/2004 | Won et al. .................... 362/260 |
| 6,880,953 B2 | * | 4/2005 | Shin .............................. 362/225 |
| 6,964,496 B2 | * | 11/2005 | Yang et al. ................... 362/220 |
| 6,984,056 B2 | * | 1/2006 | Amano et al. ............... 362/225 |
| 7,057,678 B2 | * | 6/2006 | Ishida et al. ................... 349/58 |
| 7,086,753 B2 | * | 8/2006 | Lin et al. .................... 362/225 |
| 7,167,219 B2 | * | 1/2007 | Huang et al. .................. 349/60 |
| 7,204,633 B2 | * | 4/2007 | Yun ............................. 362/614 |
| 2006/0279957 A1 | * | 12/2006 | Kwon et al. ................ 362/378 |

* cited by examiner

*Primary Examiner*—Sandra L. O'Shea
*Assistant Examiner*—Gunyoung T. Lee
(74) *Attorney, Agent, or Firm*—Cantor Colburn LLP

(57) ABSTRACT

A lamp holder includes a supporting part and a holding part. The supporting part includes a guiding hole for guiding a wire of a lamp. The holding part protrudes from the supporting part in a longitudinal direction of the lamp. A holding groove is formed at the holding part to hold an end portion of the lamp. The lamp holder improves an image display quality of a display device.

18 Claims, 14 Drawing Sheets

LAMP HOLDER, LAMP ASSEMBLY HAVING THE SAME, BACKLIGHT ASSEMBLY HAVING THE SAME AND DISPLAY DEVICE HAVING THE SAME

CROSS-REFERENCE TO RELATED APPLICATION

The present application claims priority to Korean Patent Application No. 2005-72246, filed on Aug. 8, 2005, and all the benefits accruing therefrom under 35 U.S.C. §119, the contents of which in its entirety disclosure are herein incorporated by reference.

BACKGROUND OF THE INVENTION

1. Field of the Invention

The present invention relates to a lamp holder, a lamp assembly having the lamp holder, a backlight assembly having the lamp holder and a display device having the lamp holder. More particularly, the present invention relates to a lamp holder capable of improving an image display quality, a lamp assembly having the lamp holder, a backlight assembly having the lamp holder and a display device having the lamp holder.

2. Description of the Related Art

Various electronic devices such as a mobile wireless terminal, a digital camera, a notebook computer, a monitor, etc., include a display device for displaying an image. The display device often includes a flat panel display device. The flat panel display device includes a liquid crystal display ("LCD") device, a plasma display panel ("PDP") device, an organic light emitting display ("OLED") device, etc.

The LCD device displays the image using electrical and optical characteristics of liquid crystals. The LCD device has various characteristics such as being thin and light weight, as well as having low power consumption and requiring a low driving voltage, for example. The LCD device has been widely used in various fields.

The LCD device includes a display panel and a backlight assembly. The display panel displays the image using a light transmittance of the liquid crystals. The backlight assembly supplies the display panel with a light.

The backlight assembly includes a lamp assembly that has a lamp for generating the light. The lamp assembly includes the lamp, a lamp wire and a lamp holder. The lamp wire is on an end portion of the lamp to apply an electric power to the lamp. The lamp holder fixes the lamp to a receiving container of the backlight assembly.

The backlight assembly also includes a plurality of holes and grooves for use during assembly. However, the holes or the grooves allow externally provided impurities to flow therethrough into the backlight assembly and decrease a luminance of the backlight assembly.

BRIEF SUMMARY OF THE INVENTION

The present invention provides a lamp holder capable of improving an image display quality.

The present invention also provides a lamp assembly having the above-mentioned lamp holder.

The present invention also provides a backlight assembly having the above-mentioned lamp holder.

The present invention also provides a display device having the above-mentioned lamp holder.

An exemplary embodiment of a lamp holder in accordance with the present invention includes a supporting part and a holding part. The supporting part includes a guiding hole for guiding a wire of a lamp. The holding part protrudes from the supporting part in a longitudinal direction of the lamp. A holding groove is formed at the holding part to hold an end portion of the lamp.

An exemplary embodiment of a lamp assembly in accordance with the present invention includes a lamp, a lamp wire and a lamp holder. The lamp generates a light based on an electric signal. The electric signal is applied to the lamp through an electrode that is on an end portion of the lamp. The lamp wire is electrically connected to the electrode to transmit the electric signal. The lamp holder includes a supporting part and a holding part. The supporting part has a guiding hole for guiding the lamp wire. The holding part protrudes from the supporting part in a longitudinal direction of the lamp. A holding groove is formed at the holding part to hold the end portion of the lamp.

An exemplary embodiment of a backlight assembly in accordance with the present invention includes a lamp, a lamp holder, an optical member and a first side mold. The lamp generates a light. An end portion of the lamp is electrically connected to a lamp wire. The lamp holder includes a supporting part and a holding part. The supporting part includes a guiding hole for guiding the lamp wire. The holding part protrudes from the supporting part in a longitudinal direction of the lamp. A holding groove is formed at the holding part to hold the end portion of the lamp. The optical member is on the lamp to improve optical characteristics of the light. The first side mold covers the lamp holder so that the lamp is spaced apart from the optical member by a constant distance.

An exemplary embodiment of a display device includes a display panel, a backlight assembly and a side mold. The display panel displays an image using a light. The backlight assembly includes a lamp and a lamp holder. The lamp generates the light. The lamp holder includes a supporting part and a holding part. The supporting part includes a guiding hole for guiding a lamp wire. The holding part protrudes from the supporting part in a longitudinal direction of the lamp. A holding groove is formed at the holding part to hold the end portion of the lamp. The side mold covers the lamp holder.

According to the present invention, the protrusion is formed on the lamp holder to prevent the inflow of the impurities toward the central portion of the backlight assembly, thereby improving an image display quality of the display device.

BRIEF DESCRIPTION OF THE DRAWINGS

The above and other advantages of the present invention will become more apparent by describing in detail exemplary embodiments thereof with reference to the accompanying drawings, in which.

DETAILED DESCRIPTION OF THE INVENTION

Figure 1:
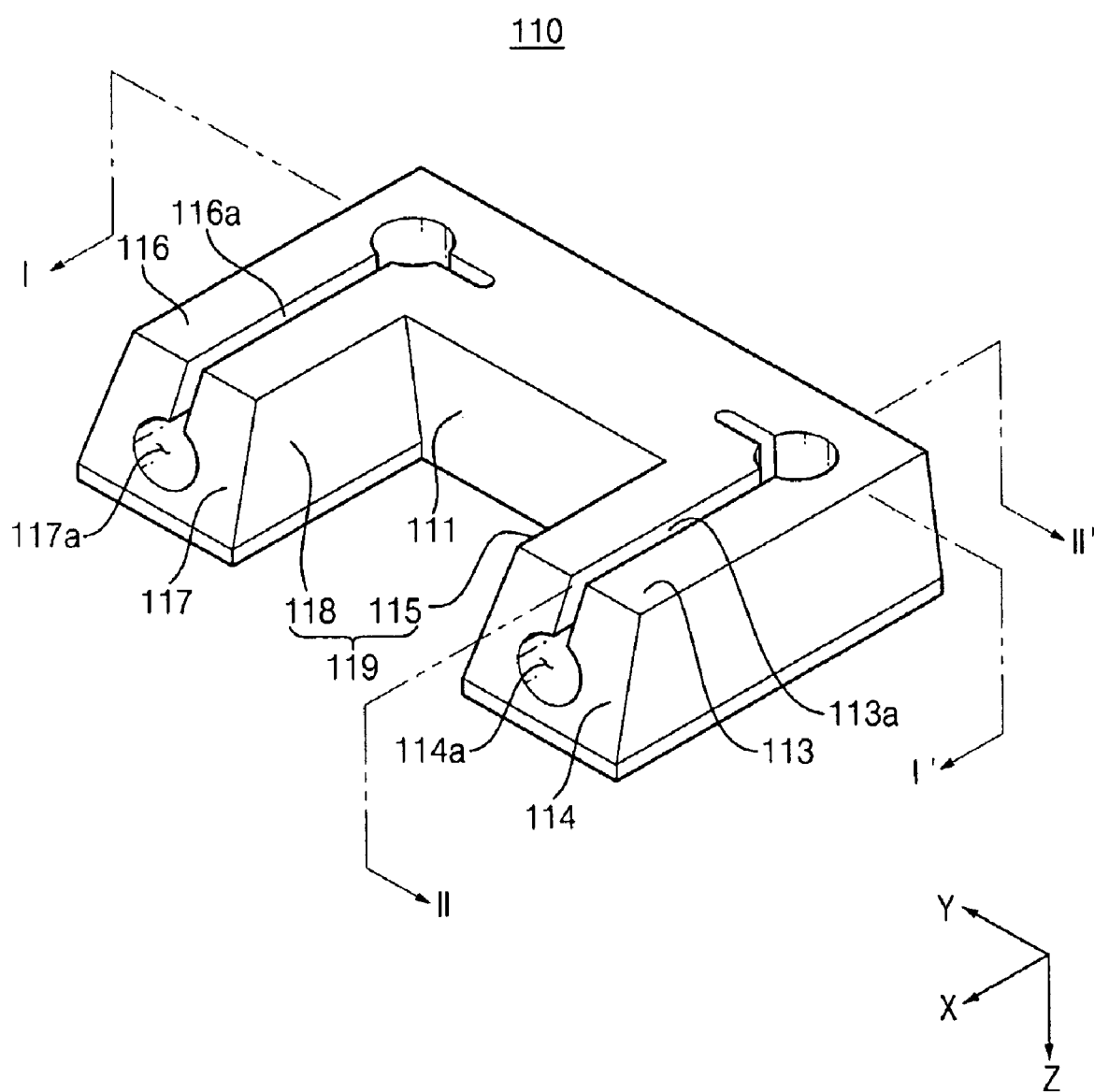
FIG. 1 is a perspective view showing an exemplary embodiment of a lamp holder in accordance with the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the size and relative sizes of layers and regions may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2A:
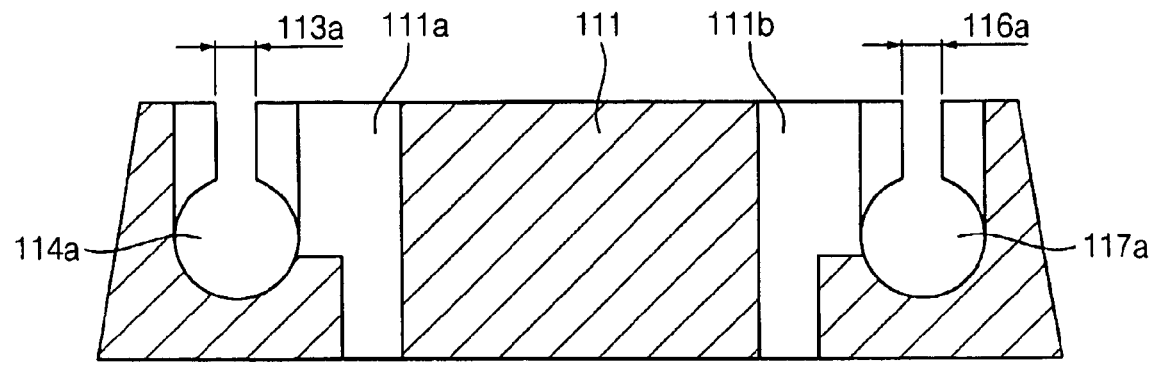
FIG. 2A is a cross-sectional view taken along a line I-I' shown in FIG. 1.
Figure 2B:
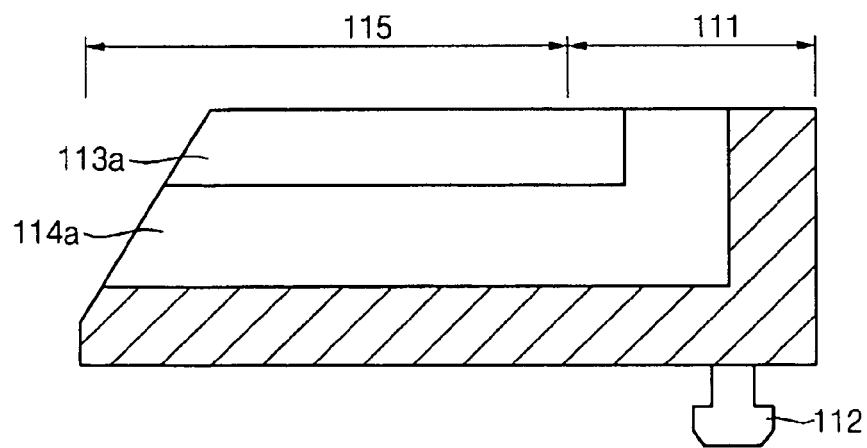
FIG. 2B is a cross-sectional view taken along a line II-II' shown in FIG. 1.

FIG. 1 is a perspective view showing an exemplary embodiment of a lamp holder in accordance with the present invention. FIG. 2A is a cross-sectional view taken along a line I-I' shown in FIG. 1. FIG. 2B is a cross-sectional view taken along a line II-II' shown in FIG. 1.

Referring to FIGS. 1 and 2B, the lamp holder includes a supporting part 111 and a holding part 119.

The supporting part 111 includes a first guiding hole 111*a*, a second guiding hole 111*b* and a fixing portion 112.

The first and second guiding holes 111*a* and 111*b* guide wires of lamps that are held by the first lamp holder 110 so that the wires are aligned in a Z direction. The fixing portion 112 is under the supporting part 111 to fix the first lamp holder 110 to an external body such as a receiving container.

The holding part 119 includes a first holding portion 115 and a second holding portion 118. The first holding portion 115 protrudes from a first end portion of the supporting part 111 in an X direction that may be a longitudinal direction of the lamp (not shown). The second holding portion 118 protrudes from a second end portion of the supporting part 111 also in the X direction.

The first holding portion 115 includes a first surface 113 and a second surface 114. A first opening groove 113*a* is formed at the first surface 113. The second surface 114 is connected to the first surface 113, and a first holding groove 114*a* that is connected to the first opening groove 113*a* is formed at the second surface 114.

Figure 3:
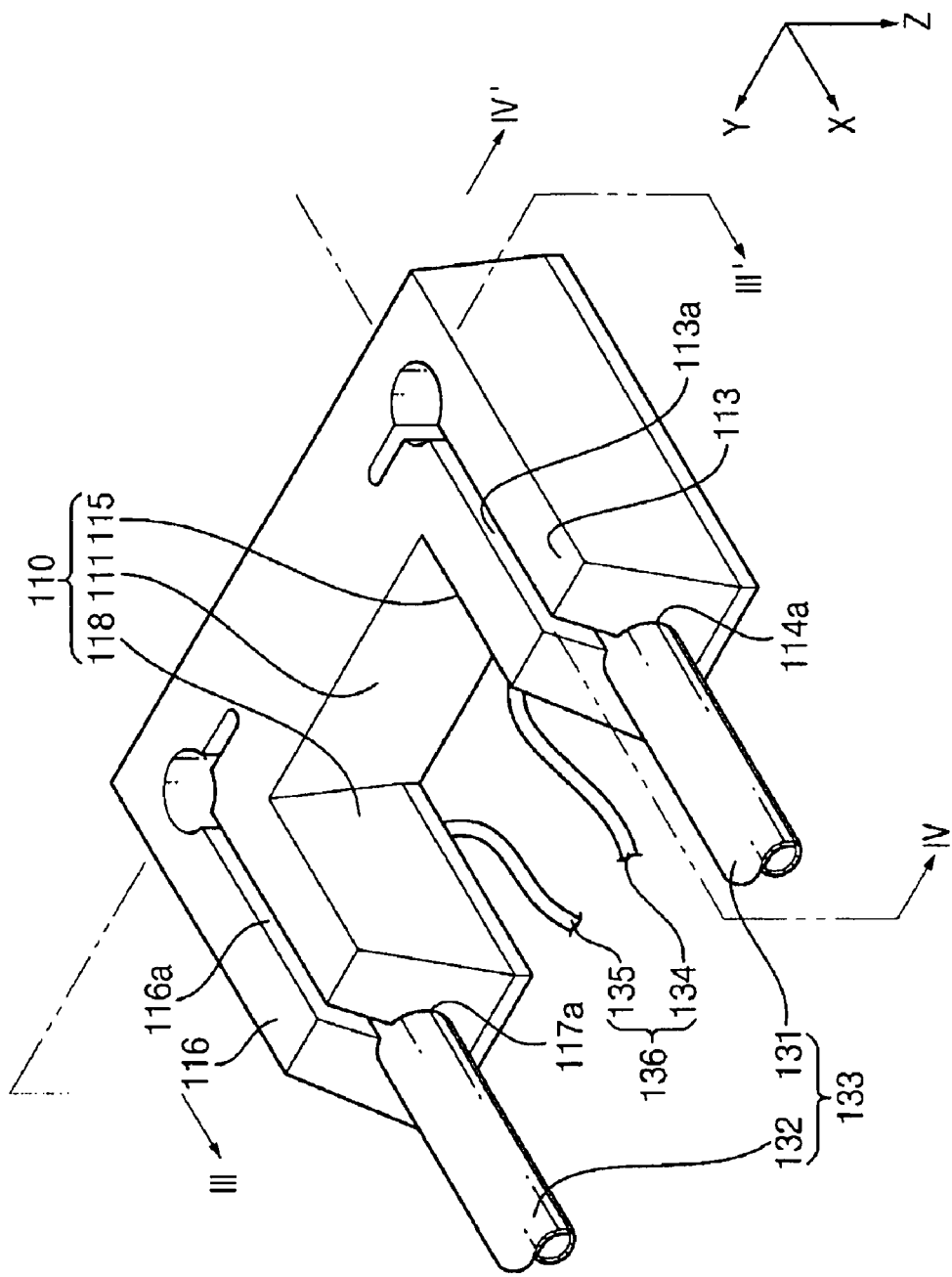
FIG. 3 is a perspective view showing an exemplary embodiment of a lamp assembly in accordance with the present invention.

Further, as shown in FIG. 3, the first opening groove 113*a* has a slit shape. An end portion of a first lamp (131) is inserted into the first opening groove 113*a*. The first holding groove 114*a* is formed in the first holding portion 115 in the X direction that is the longitudinal direction of the first lamp 131. The first opening groove 113*a* holds the end portion of the first lamp 131 that is inserted into the first opening groove 113*a*. The first holding groove 114*a* is connected to the first guiding hole (111*a* in FIG. 2A).

The second surface 114 may slant toward or be angled relative to the first surface 113 to form a substantially trapezoidal shape.

For example, the second surface 114 may have a substantially trapezoidal shape having a lower side and an upper side that is shorter than the lower side. When the second surface 114 slants toward the first surface 113, a luminance of a peripheral region of a display device is increased.

The second holding portion 118 includes a third surface 116 and a fourth surface 117. A second opening groove 116*a* is formed at the third surface 116. The fourth surface 117 is connected to the third surface 116, and a second holding groove 116*a* that is connected to the second opening groove 117*a* is formed at the fourth surface 117.

The second opening groove 116*a* has a slit shape. An end portion of a second lamp (132 in FIG. 3) is inserted into the second opening groove 116*a*. The second holding groove 117*a* is formed in the second holding portion 118 in the X direction that is the longitudinal direction of the second lamp 132. The second opening groove 116*a* holds the end portion of the second lamp 132 that is inserted into the second opening groove 116*a*. The second holding groove 117*a* is connected to the second guiding hole 111*b*.

The fourth surface 117 may slant toward or be angled relative to the third surface 116 to form a substantially trapezoidal shape.

For example, the fourth surface 117 may have a substantially trapezoidal shape having a lower side and an upper side that is shorter than the lower side. When the fourth surface 117 slants toward the third surface 116, the luminance of the peripheral region of the display device is increased.

The supporting part 110 may be integrally formed with the holding part 119 to form the first lamp holder 110, and the supporting part 110 may include an elastic material such as rubber.

Lamp Assembly

Figure 4A:
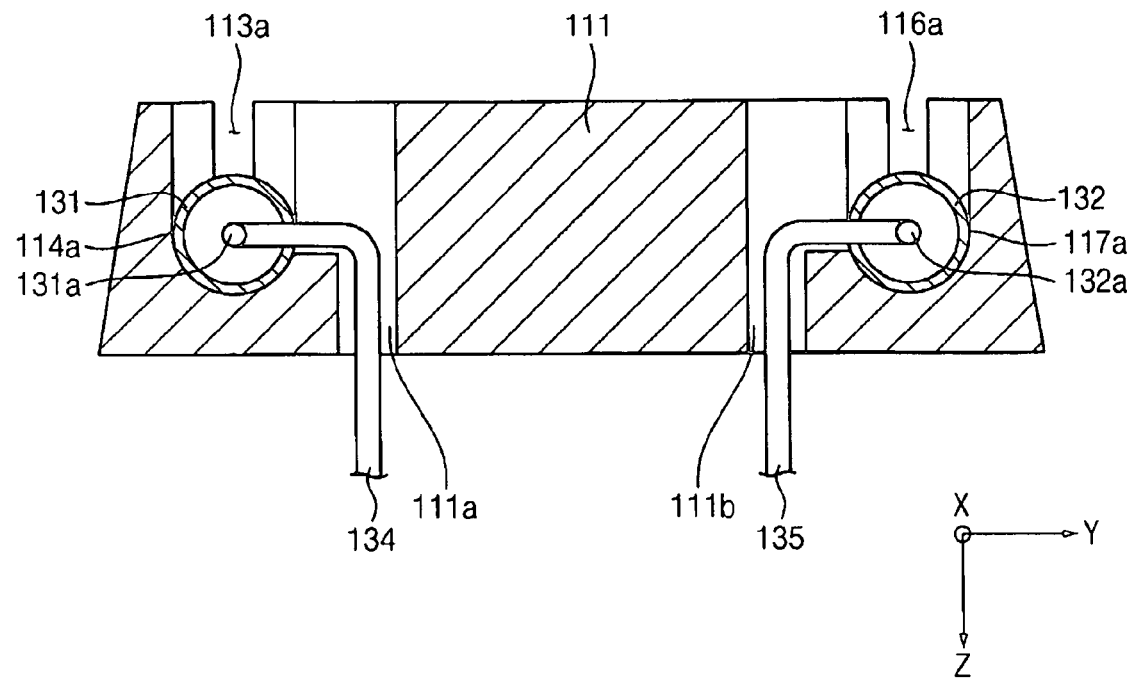
FIG. 4A is a cross-sectional view taken along a line III-III' shown in FIG. 3.
Figure 4B:
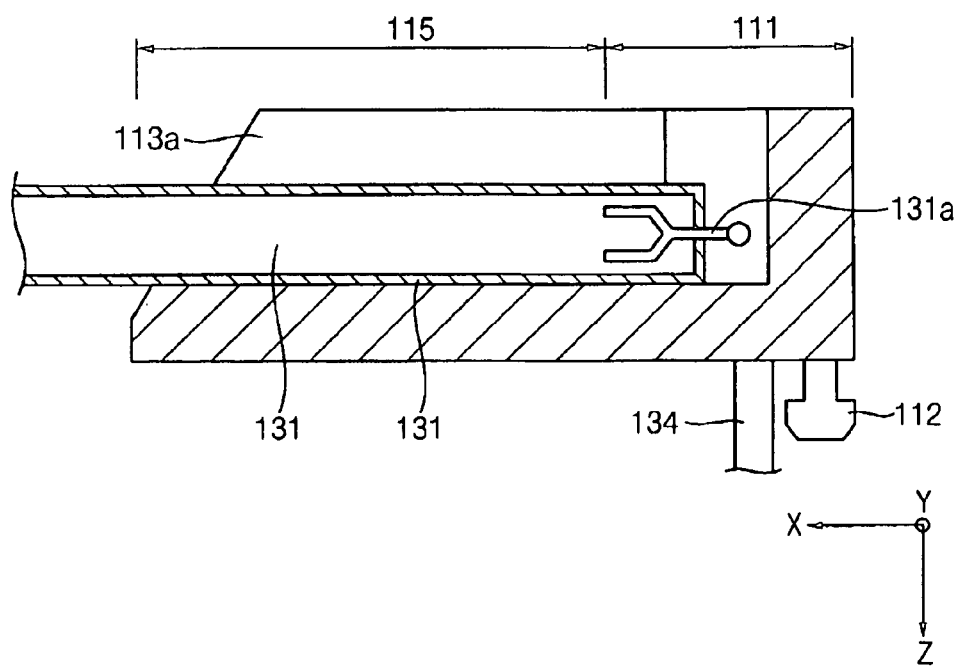
FIG. 4B is a cross-sectional view taken along a line IV-IV' shown in FIG. 3.

FIG. 3 is a perspective view showing an exemplary embodiment of a lamp assembly in accordance with the present invention. FIG. 4A is a cross-sectional view taken along a line III-III' shown in FIG. 3. FIG. 4B is a cross-sectional view taken along a line IV-IV' shown in FIG. 3.

Referring to FIGS. 3 to 4B, the lamp assembly includes a lamp holder 110, a lamp part 133 and a lamp wire part 136.

The lamp part 133 includes the first lamp 131 and the second lamp 132 (both partially shown in FIG. 3) that is substantially parallel with the first lamp 131. The end portions of the first and second lamps 131 and 132 are inserted into the first and second holding grooves 114a and 117a, respectively, of the first lamp holder 110.

Each of the first and second lamps 131 and 132 has a substantially cylindrical shape having a discharge space. Each of the first and second lamps 131 and 132 includes a transparent material. Examples of the transparent material that can be used for the first and second lamps 131 and 132 include glass, quartz, etc. For example, each of the first and second lamps 131 and 132 may include a glass tube. A discharge gas (not shown) is in the discharge space. Examples of the discharge gas (not shown) that can be filled in the discharge space include mercury, argon, neon, xenon, krypton, etc.

When the mercury is discharged, an ultraviolet light is generated. In addition, argon, neon, xenon and krypton are ionized to generate secondary electrons to increase an amount of the ultraviolet light, and decrease a voltage level for the discharge through Penning effect, thereby decreasing a power consumption of the first and second lamps 131 and 132.

A fluorescent layer (not shown) is on an internal surface of each of the first and second lamps 131 and 132. The fluorescent layer (not shown) converts the ultraviolet light that is generated using the mercury into a visible light.

The first and second lamps 131 and 132 include a first electrode 131a and a second electrode 132a on the end portions of the first and second lamps 131 and 132, respectively. A driving voltage is applied to the first and second electrodes 131a and 132a to discharge the discharge gas in the first and second lamps 131 and 132.

The lamp wire part 136 includes a first lamp wire 134 and a second lamp wire 135 that are soldered to the first and second electrodes 131a and 132a, respectively. The driving voltage is applied to the first and second electrodes 131a and 132a through the first and second lamp wires 134 and 135, respectively.

The first lamp holder 110 includes the supporting part 111, a first holding portion 115 and a second holding portion 118. In particular, the supporting part 111 includes the first guiding hole 111a and the second guiding hole 111b.

The first lamp wire 134 is guided from an exterior toward the first lamp holder 110 through the first guiding hole 111a. The second lamp wire 135 is guided from the exterior toward the first lamp holder 110 through the second guiding hole 111b.

The first and second holding portions 115 and 118 hold the end portions of the first and second lamps 131 and 132, respectively.

In particular, the first opening groove 113a and the first holding groove 114a that is connected to the first opening groove 113a are formed at the first holding portion 115. The end portion of the first lamp 131 is inserted into the first holding groove 114a through the first opening groove 113a. The first lamp wire 134 that is electrically connected to the first electrode 131a of the first lamp 131 is guided from the exterior toward the first lamp holder 110 through the first guiding hole 111a.

The second opening groove 116a and the second holding groove 117a that is connected to the second opening groove 116a are formed at the second holding portion 118. The end portion of the second lamp 132 is inserted into the second holding groove 117a through the second opening groove 116a. The second lamp wire 135 that is electrically connected to the second electrode 132a of the second lamp 132 is guided from the exterior toward the first lamp holder 110 through the second guiding hole 111b.

Figure 5:
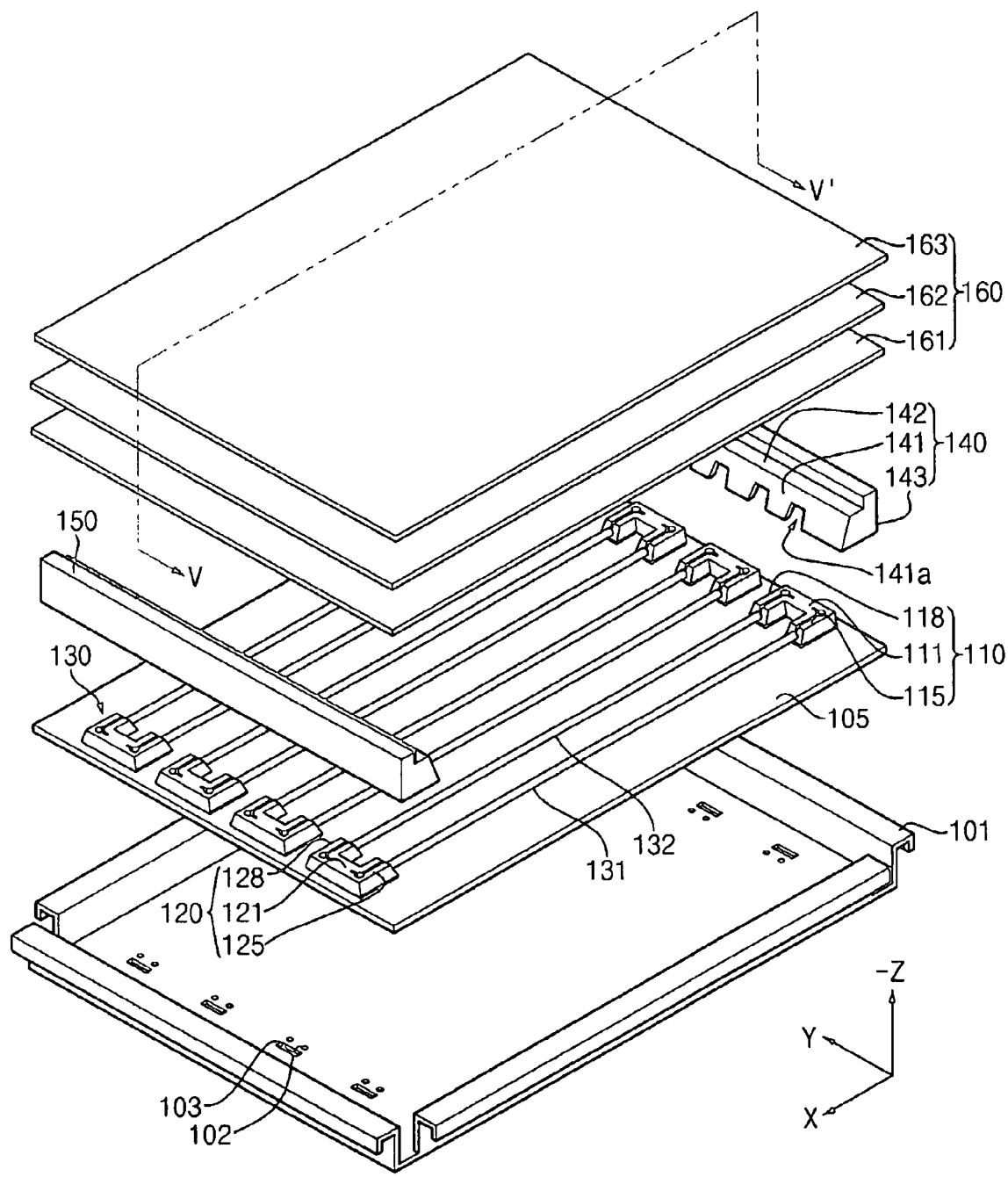
FIG. 5 is an exploded perspective view showing an exemplary embodiment of a backlight assembly in accordance with the present invention.
Figure 6:
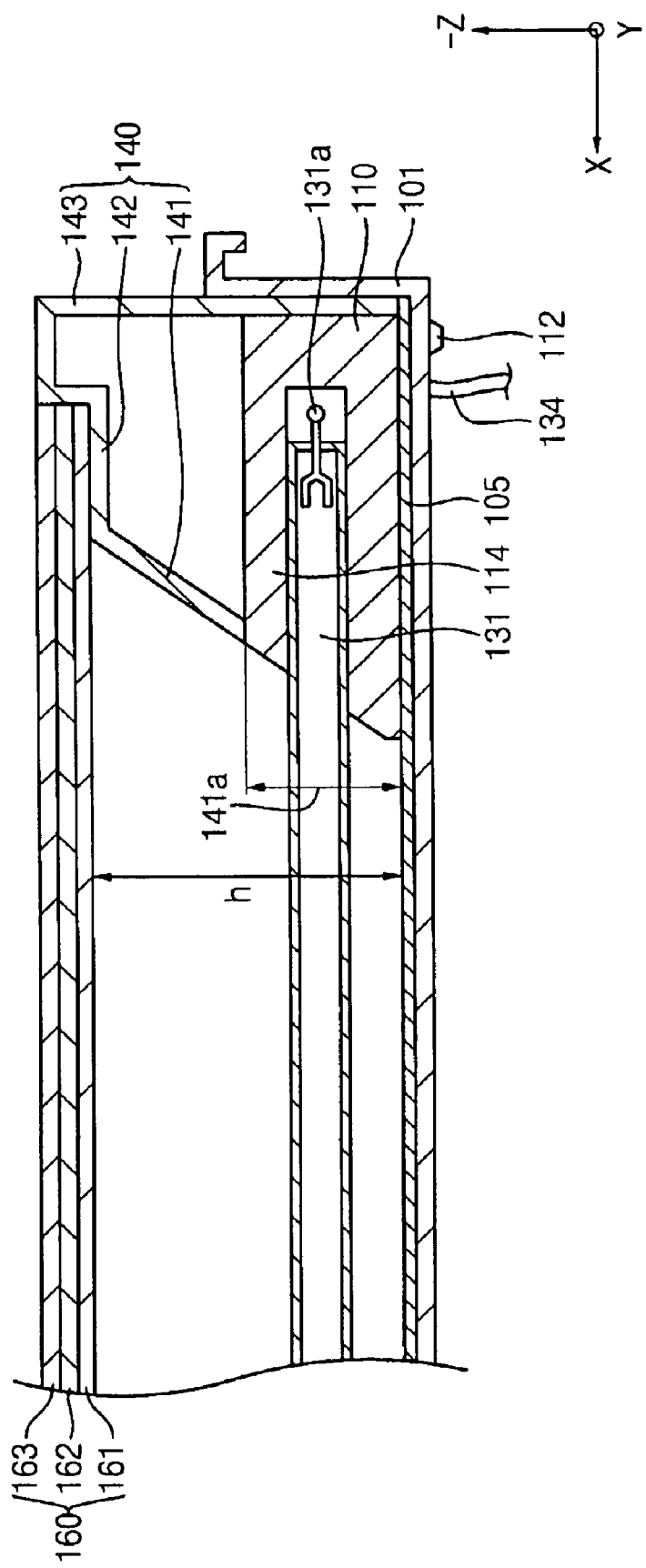
FIG. 6 is a partial cross-sectional view taken along a line V-V' shown in FIG. 5.
Figure 7:
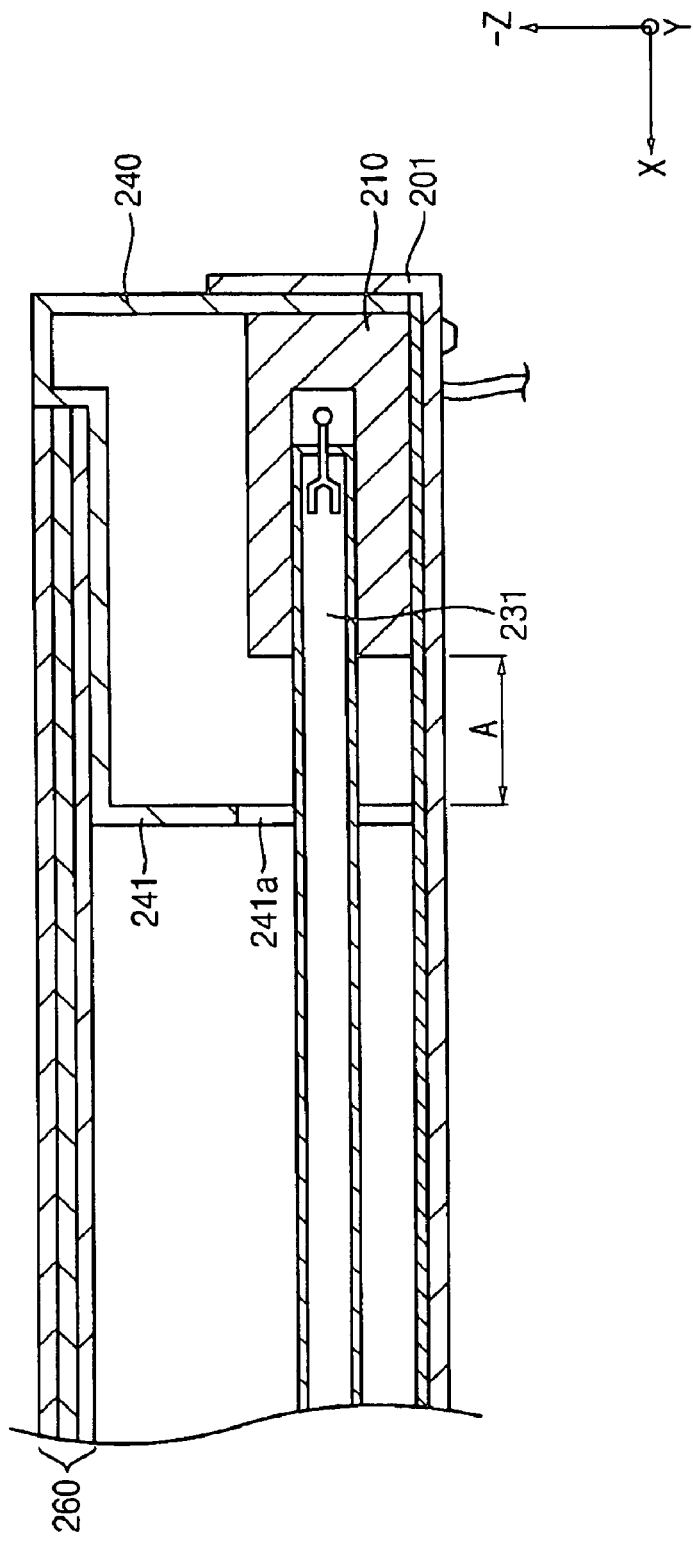
FIG. 7 is a partial cross-sectional view showing another exemplary embodiment of a backlight assembly in accordance with the present invention.

FIG. 5 is an exploded perspective view showing an exemplary embodiment of a backlight assembly in accordance with the present invention. FIG. 6 is a partial cross-sectional view taken along a line V-V' shown in FIG. 5. FIG. 7 is a partial cross-sectional view showing another exemplary embodiment of a backlight assembly in accordance with the present invention.

Referring to FIGS. 5 and 6, the backlight assembly includes a receiving container 101, a reflecting plate 105, a lamp assembly 130, a first side mold 140, a second side mold 150 and an optical member 160.

The receiving container 101 includes a bottom plate and a plurality of sidewalls that protrude from sides of the bottom plate. The reflecting plate 105, the lamp assembly 130, the first and second side molds 140 and 150 and the optical member 160 are received in the receiving container 101.

A plurality of apertures 102 is formed at the bottom plate to guide lamp wires of the lamp assembly 130 from an exterior toward the receiving container 101. In addition, a plurality of fixing grooves or slots 103 is formed at the bottom plate to fix lamp holders of the lamp assembly 130 to the receiving container 101.

The reflecting plate 105 is on the bottom plate of the receiving container 101 so that a light generated from the lamp assembly 130 is reflected from the reflecting plate 105. Alternatively, a highly reflective material may be coated on the bottom surface of the receiving container 101 so that the reflecting plate 105 may be omitted.

The lamp assembly 130 includes a first lamp holder 110, a second lamp holder 120, a plurality of lamps 131 and 132 and a plurality of lamp wires (not shown).

Each of the lamps 131 and 132 extends in a longitudinal direction between first and second lamp holders 110 and 120. The lamp wires (not shown) are electrically connected to first and second end portions of the lamps 131 and 132.

The first lamp holder 110 is on the first end portions of the lamps 131 and 132 to hold the first end portions of the lamps 131 and 132. The first lamp holder 110 includes a supporting part 111, a first holding portion 115 and a second holding portion 118. The first and second holding portions 115 and 118 protrude from the supporting part 111.

The first lamp holder 110 of FIGS. 5 and 6 is same as in FIGS. 1 to 4B. Thus, the same reference numerals will be used to refer to the same or like parts as those described in FIGS. 1 to 4B and any further explanation will be omitted.

The second lamp holder 120 is on the second end portions of the lamps 131 and 132 to hold the second end portions of the lamps 131 and 132. The second lamp holder 120 includes a supporting part 121, a third holding portion 125 and a fourth holding portion 128. The third and fourth holding portions 125 and 128 protrude from the supporting part 121.

The second lamp holder 120 of FIGS. 5 and 6 is same as in FIGS. 1 to 4B. Thus, the same reference numerals will be used to refer to the same or like parts as those described in FIGS. 1 to 4B and any further explanation will be omitted.

The first side mold 140 covers the first lamp holder 110 so that the optical member 160 that is on the first side mold 140 is spaced apart from the lamps 131 and 132 by a predetermined distance.

The first side mold 140 includes a first surface 141, a second surface 142 and a third surface 143. The first surface 141 makes contact with a bottom surface of the receiving container 101 or the reflecting plate 105 (as illustrated). The third surface 143 also makes contact with a bottom surface of the receiving container 101 or the reflecting plate 105 and corresponds to the first surface 141. The second surface 142 is connected between the first and third surfaces 141 and 143.

A plurality of openings 141a is formed on the first surface 141 corresponding to the first and second holding portions 115 and 118 of the first lamp holder 110. Each of the openings 141a has a substantially trapezoidal cross-section corresponding to the first and second holding portions 115 and 118 of the first lamp holder 110. For example, the trapezoidal cross-section of each of the openings 141a has a lower side and an upper side that is shorter than the lower side.

A stepped portion is formed on the second surface 142 to receive the optical member 160. The first surface 141, which extends from the bottom surface of the reflecting plate 105 to meet the second surface 142, has a constant width so that the optical member 160 is spaced apart from the lamps 131 and 132 by the predetermined distance.

When the first side mold 140 is received in the backlight assembly having the first lamp holder 110, the openings 141a of the first side mold 140 surround the first holding portion 114. A portion of the first surface 141 between the openings 141a makes contact with the bottom surface of the reflecting plate 105.

Therefore, the first holding portion 115 of the first lamp holder 110 seals the openings 141a of the first side mold 140 so that impurities do not flow into the backlight assembly.

The receiving container 101 may include a hole or aperture 102 for guiding a lamp wire 134 (FIGS. 3 and 4), a fixing groove or slot 103 for fixing a fixing portion 112 of the first lamp holder 110, etc., to be combined with various elements.

When the impurities flow through the hole 102 or the fixing groove or slot 103, the impurities may be in an active region that is a central region of the backlight assembly and deteriorate an image display quality of the display device.

FIG. 7 is a cross-sectional view showing another exemplary embodiment of a backlight assembly in accordance with the present invention.

Referring to FIG. 7, the backlight assembly includes a receiving container 201, a lamp 231, a lamp holder 210, a side mold 240 and an optical member 260.

A lamp holder 210 that holds an end portion of the lamp 231 is received in the receiving container 201. A side mold 240 that covers the lamp holder 210 is on the lamp holder 210. The optical member 260 is received on the side mold 240. An opening 241a for receiving the lamp 231 is formed on a first surface of the side mold 240.

A space 'A' is formed between the lamp holder 210 and the opening 241a of the side mold 240. Impurities may flow into the space 'A' of the receiving container 201, and the impurities in the space 'A' may also flow into a central region of the receiving container 201 through the opening 241a. Therefore, a luminance of a central portion of the display device may be deteriorated.

However, referring again to FIGS. 5 and 6, when the first lamp holder 110 has the holding portions 115 and 118 that protrude substantially parallel with a longitudinal direction of the lamp 231, the impurities may not flow into the active region of the backlight assembly.

The second side mold 150 covers the second lamp holder 120 so that the optical member 160 is spaced apart from the lamps 131 and 132. The second side mold (not shown) of FIG. 7 is the same as in the first side mold of FIGS. 5 and 6. Thus, any further explanation will be omitted.

The optical member 160 includes a diffusion plate 161 and brightness enhancement sheets 162 and 163. The diffusion plate 161 diffuses a light generated from the lamps 131 and 132 to increase a luminance uniformity of the backlight assembly.

The brightness enhancement sheets 162 and 163 are on the diffusion plate 161 to increase a luminance of the light that has passed through the diffusion plate 161 when viewed on a plane. Alternatively, a protection sheet (not shown) may be on the brightness enhancement sheets 162 and 163 to protect the brightness enhancement sheets 162 and 163 from heat or impact.

Figure 8:
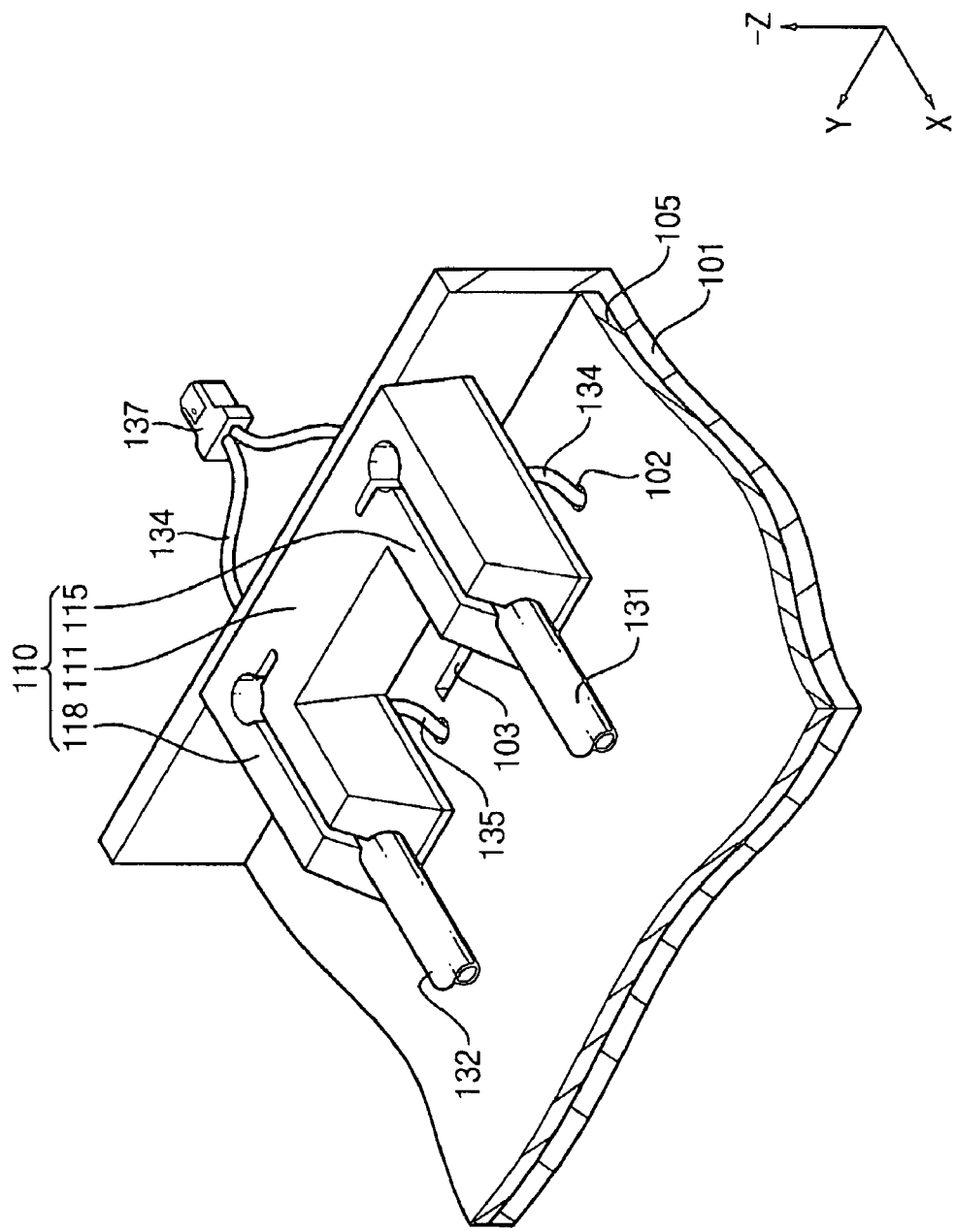
FIG. 8 is an enlarged partial perspective view showing a lamp holder shown in FIG. 5.

FIG. 8 is an enlarged perspective view showing a lamp holder shown in FIG. 5.

Referring to FIGS. 5 to 8, the lamp assembly 130 is fixed to the receiving container 101 that has the reflecting plate 105. The reflecting plate 105 is between the lamp assembly 130 and the receiving container 101.

In particular, the lamp assembly 130 includes the first lamp holder 110, the lamps 131 and 132 and the lamp wires 134 and 135. The first lamp holder 110 includes the supporting part 111 and the first and second holding portions 115 and 118, respectively. The supporting part 111 includes guiding holes (not shown) for guiding the lamp wires 134 and 135, and a fixing portion 112 (FIG. 6) for fixing the first lamp holder 110 to the receiving container 101.

The lamp wires 134 and 135 that are guided by the guiding holes (not shown) of the supporting part 111 are guided from an exterior to the first lamp holder 110 through the holes 102 of the receiving container 101 and the reflecting plate 105.

The lamp wires 134 and 135 that are guided from the exterior to the first lamp holder 110 are electrically connected to a connector 137. The driving voltage is applied to the lamps 131 and 132 through the connector 137.

The fixing portion 112 (FIG. 6) of the supporting part 111 is inserted into the fixing groove or slot 103 that is formed through the receiving container 101 and the reflecting plate 105 to be fixed to the receiving container 101 and the reflecting plate 105.

Figure 9:
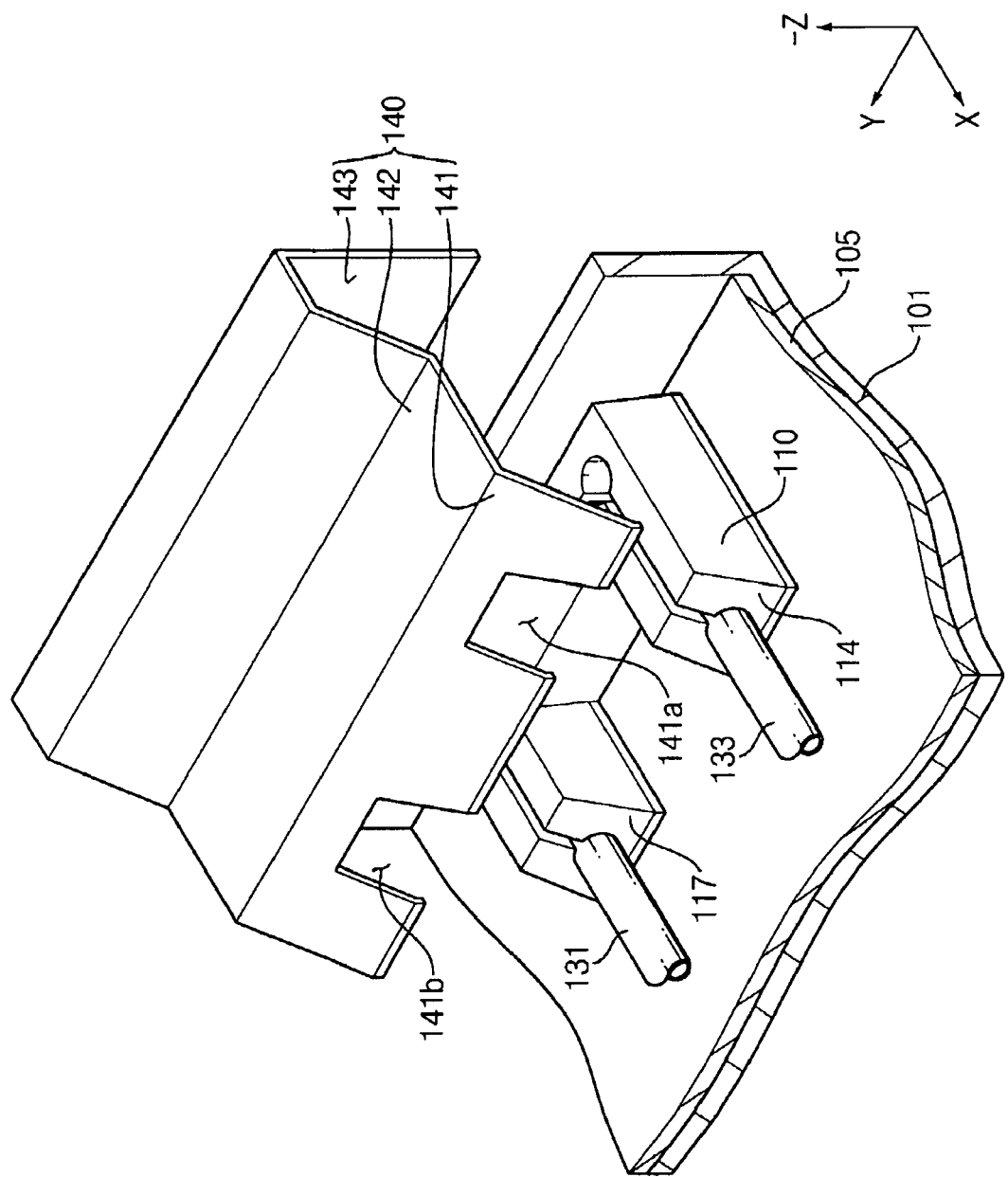
FIG. 9 is an enlarged partial perspective view showing a lamp holder and a side mold shown in FIG. 5.

FIG. 9 is an enlarged perspective view showing a lamp holder and a side mold shown in FIG. 5.

Referring to FIGS. 5 and 9, the first lamp holder 110 is fixed to the receiving container 101. The first side mold 140 is on the first lamp holder 110 to cover the first lamp holder 110.

The first side mold 140 covers the first lamp holder 110 so that the optical member 160 is spaced apart from the lamps 131 and 132.

The first side mold 140 includes the first surface 141, the second surface 142 and the third surface 143. The first surface 141 makes contact with the bottom surface of the reflecting plate 105. The third surface 143 also makes contact with the bottom surface of the reflecting plate 105 and corresponds to the first surface 141. The second surface 142 is connected between the first and third surfaces 141 and 143.

A plurality of openings 141a and 141b is formed on the first surface 141 corresponding to the first and second holding portions 115 and 118, respectively, of the first lamp holder 110. Each of the openings 141a and 141b has a substantially trapezoidal shape or cross-section corresponding to the first and second holding portions 115 and 118, respectively. For example, the trapezoidal cross-section of each of the openings 141a and 141b has a lower side and an upper side that is shorter than the lower side.

A stepped portion is formed on the second surface 142 to receive the optical member 160. The first surface 141, which extends from the bottom surface of the reflecting plate 105 to meet second surface 142 has a constant width so that the optical member 160 is spaced apart from the lamps 131 and 132 by the predetermined distance.

Figure 10:
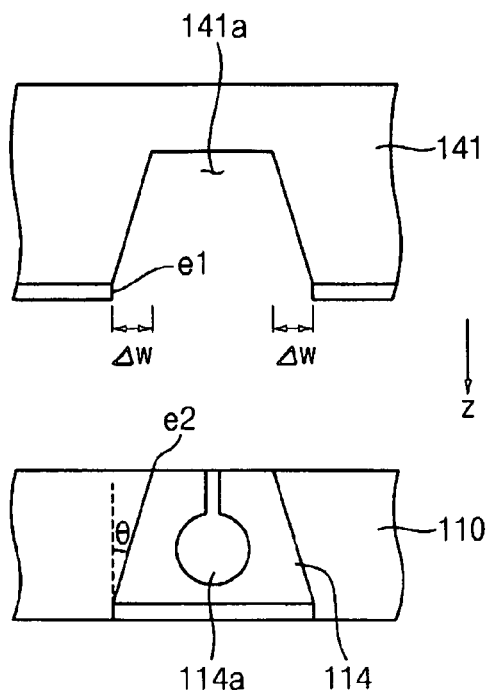
FIG. 10 is an enlarged partial cross-sectional view showing the lamp holder and the side mold shown in FIG. 9.

FIG. 10 is an enlarged partial cross-sectional view showing the lamp holder and the side mold shown in FIG. 9.

Referring to FIGS. 9 and 10, a plurality of openings 141a is formed at the first surface 141 of the first side mold 140. Opposite sides defining each of the openings 141a slant toward each other by a predetermined angle θ to form a substantially trapezoidal shape. The trapezoidal shape of each of the openings 141a has a lower side and an upper side that is shorter than the lower side.

The first holding portion 115 of the first lamp holder 110 has a substantially trapezoidal cross-section 114. The trapezoidal cross-section 114 of the first holding portion 115 has a lower side and an upper side that is shorter than the lower side.

When the first side mold 140 is combined with the first lamp holder 110 in a Z-axis direction from a lower portion of the first lamp holder 110 toward an upper portion of the first lamp holder 110 to cover the first lamp holder 110, the longer side of the opening 141a covers the trapezoidal cross-section 114 from the shorter upper side toward the longer lower side of the trapezoidal cross-section 114.

A first edge e1 of the lower side of each of the openings 141a is spaced apart from a second edge e2 of the upper side of the trapezoidal cross-section 114 of the first holding portion 115 by a constant width Δw so that the first side mold 140 may be easily combined with the first lamp holder 110.

Figure 11:
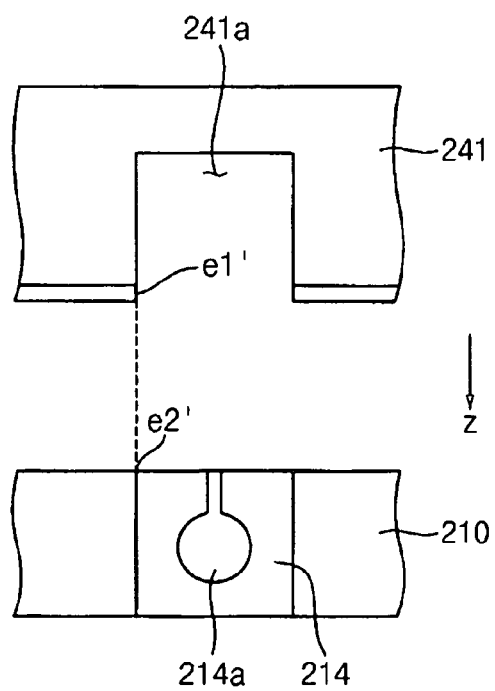
FIG. 11 is an enlarged partial cross-sectional view showing another exemplary embodiment of a lamp holder and a side mold in accordance with the present invention.

FIG. 11 is an enlarged partial cross-sectional view showing another exemplary embodiment of a lamp holder and a side mold in accordance with the present invention.

Referring to FIG. 11, a plurality of openings 241a is formed on a first surface 241 of the first side mold 240. Opposite sides of each of the openings 241a are substantially parallel with each other to form a substantially rectangular shape. In addition, the first lamp holder 210 corresponding to each of the openings 241a has a substantially rectangular cross-section 214.

When the first side mold 140 is combined with the first lamp holder 210 in a Z-axis direction from a lower portion of the first lamp holder 210 toward an upper portion of the first lamp holder 210, the first lamp holder 210 is covered. A first edge e1' of the lower side of each of the openings 241a corresponds to a second edge e2' of the upper side of the trapezoidal cross-section 214 so that a gap is not formed between the side of the openings 241a and the side of the rectangular cross-section 214.

Therefore, the first side mold 140 may not be easily combined with the first lamp holder 210 to increase a manufacturing time of the present invention compared with the exemplary embodiment of FIG. 10.

Referring again to FIG. 10, the first edge e1 of the lower side of each of the openings 141a is spaced apart from the second edge e2 of the upper side of the trapezoidal cross-section 114 of the first holding portion 115 by the constant width Δw so that the first side mold 140 may be easily combined with the first lamp holder 110. Therefore, a manufacturing process of the display device is simplified compared with the exemplary embodiment of FIG. 11.

Display Device

Figure 12:
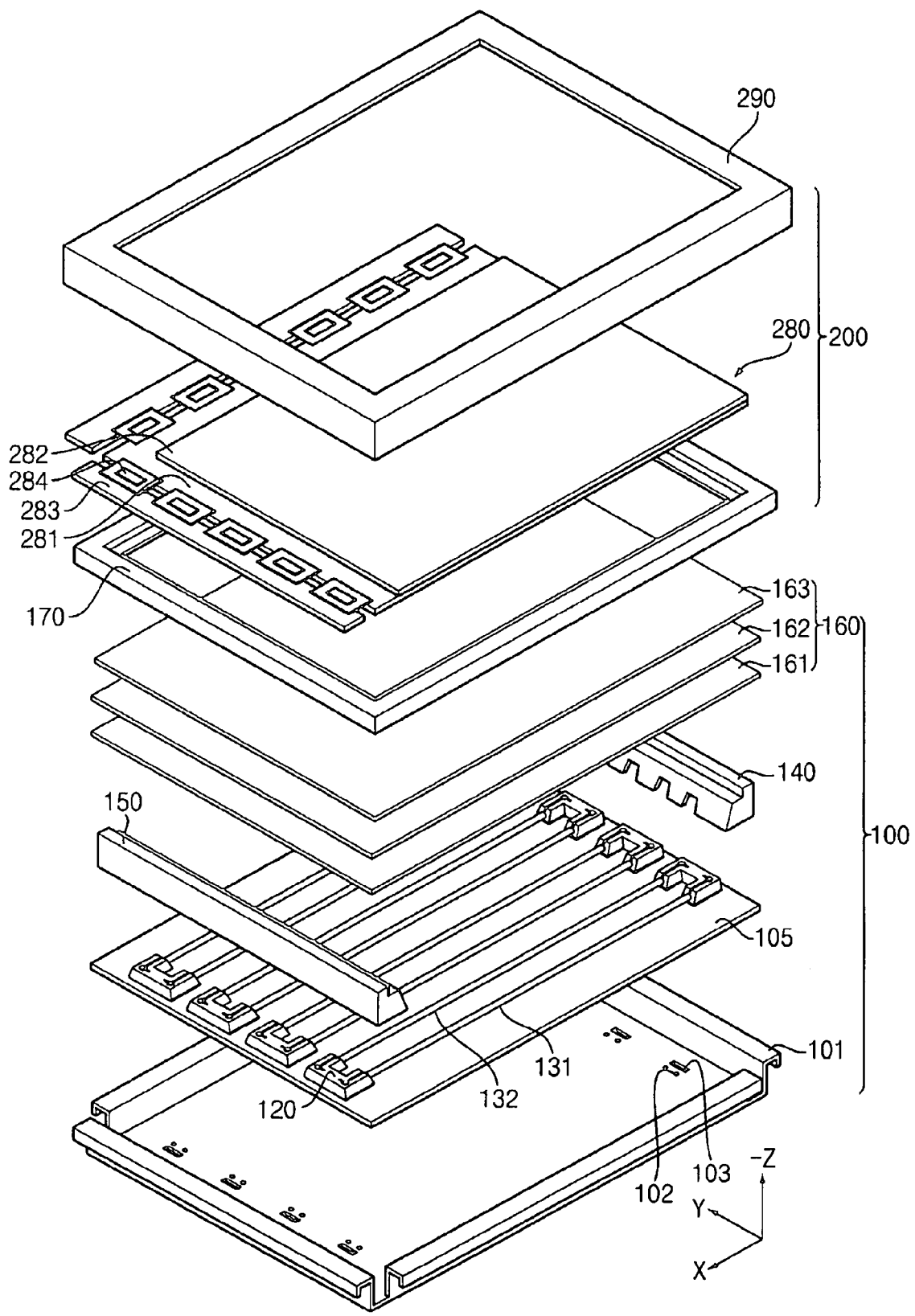
FIG. 12 is an exploded perspective view showing an exemplary embodiment of a display device in accordance with the present invention.
Figure 13:
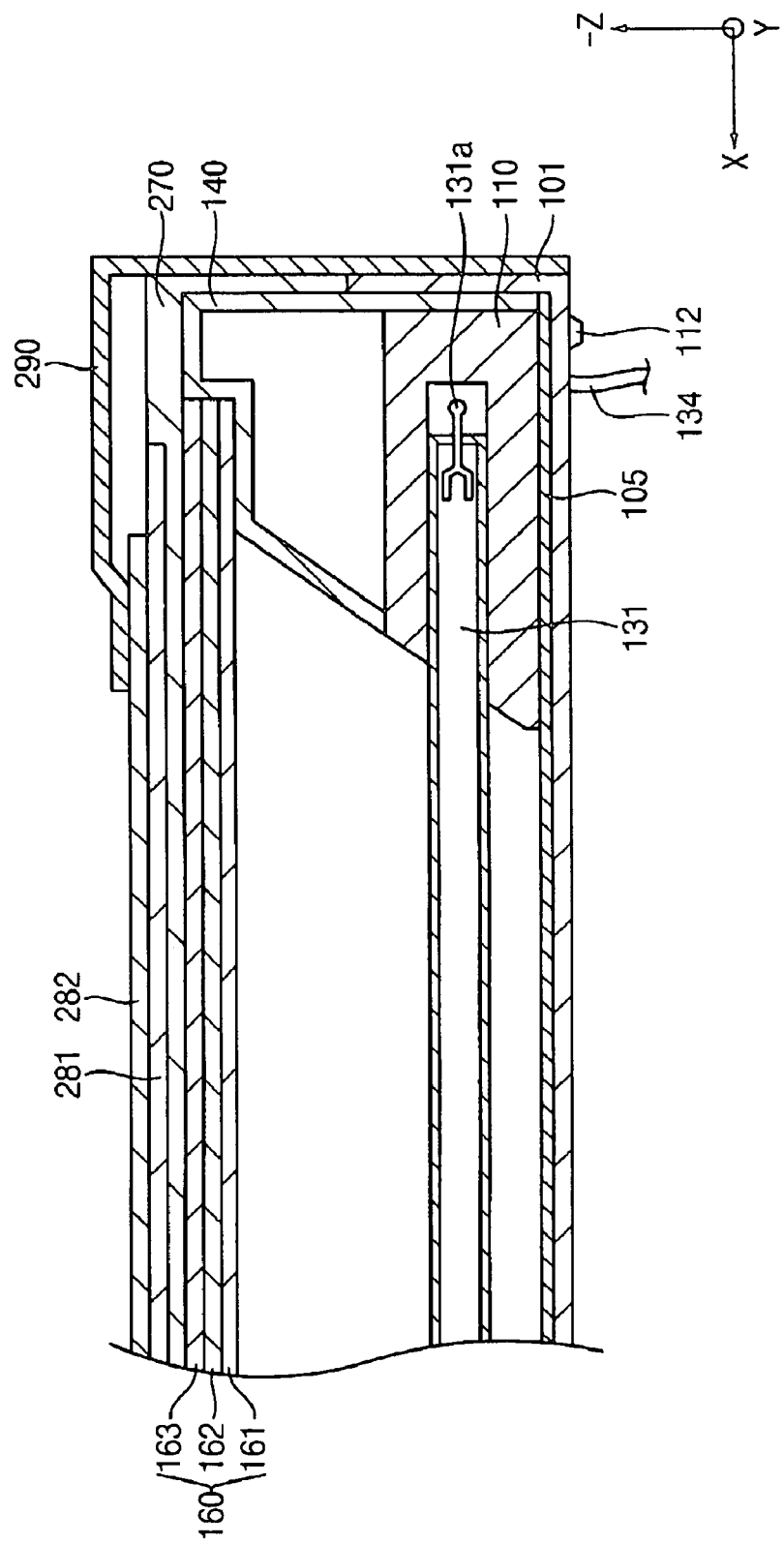
FIG. 13 is a partial cross-sectional view showing the display device shown in FIG. 12.

FIG. 12 is an exploded perspective view showing an exemplary embodiment of a display device in accordance with the present invention. FIG. 13 is a partial cross-sectional view showing the display device shown in FIG. 12.

Referring to FIGS. 12 and 13, the display device includes a backlight assembly 100 and a display assembly 200.

The backlight assembly 100 of FIGS. 12 and 13 is same as in FIG. 5. Thus, the same reference numerals will be used to refer to the same or like parts as those described in FIG. 5 and any further explanation will be omitted.

The display assembly 200 includes a middle mold frame 270, a display panel 280 and a top chassis 290.

The middle mold frame 270 is on a receiving container 101, and presses a peripheral portion of an optical member 160 that is on a first side mold 140 and a second side mold 150 to fix the optical member 160 to the receiving container 101.

The display panel 280 includes a first substrate 281, a second substrate 282, a liquid crystal layer (not shown), a printed circuit board 283 and a flexible circuit board 284.

The first substrate 281 includes a plurality of pixel electrodes, a plurality of thin film transistors TFT and a plurality of lines. The pixel electrodes are arranged in a matrix array. Each of the thin film transistors TFT applies a driving voltage to each of the pixel electrodes. The lines are electrically connected to the thin film transistors TFT.

Each pixel electrode includes a transparent conductive material. Examples of the transparent conductive material that can be used for the pixel electrodes include indium tin oxide (ITO), indium zinc oxide (IZO), amorphous indium tin oxide (a-ITO), etc.

The second substrate 282 corresponds to the first substrate 281. The second substrate 282 includes a common electrode and a color filter layer. The common electrode of the second substrate 282 corresponds to the pixel electrodes of the first substrate 281. The color filter includes red, green and blue color filter portions. The color filter portions correspond to respective pixel electrodes.

The liquid crystal layer (not shown) is interposed between the first and second substrates 281 and 282. Liquid crystals of the liquid crystal layer (not shown) varies in arrangement in response to an electric field formed between the pixel electrodes and the common electrode, and thus a light transmittance of the liquid crystal layer (not shown) is changed to display an image.

The printed circuit board 283 includes a driving circuit unit (not shown) for processing an image signal. The driving circuit unit (not shown) processes the image signal and a control signal to apply the image and control signals to the first and second substrates 281 and 282.

The flexible circuit board 284 applies driving signals to the thin film transistors TFT of the first substrate 281 based on the image and control signals that are from the printed circuit board 283. The driving signals include data and gate signals.

The top chassis 290 surrounds a peripheral portion of the display panel 280 to be combined with the receiving container 101. The top chassis 290 protects the display panel 280 from external impact. In addition, the top chassis 290 prevents drift of the display panel 280.

Figure 14:
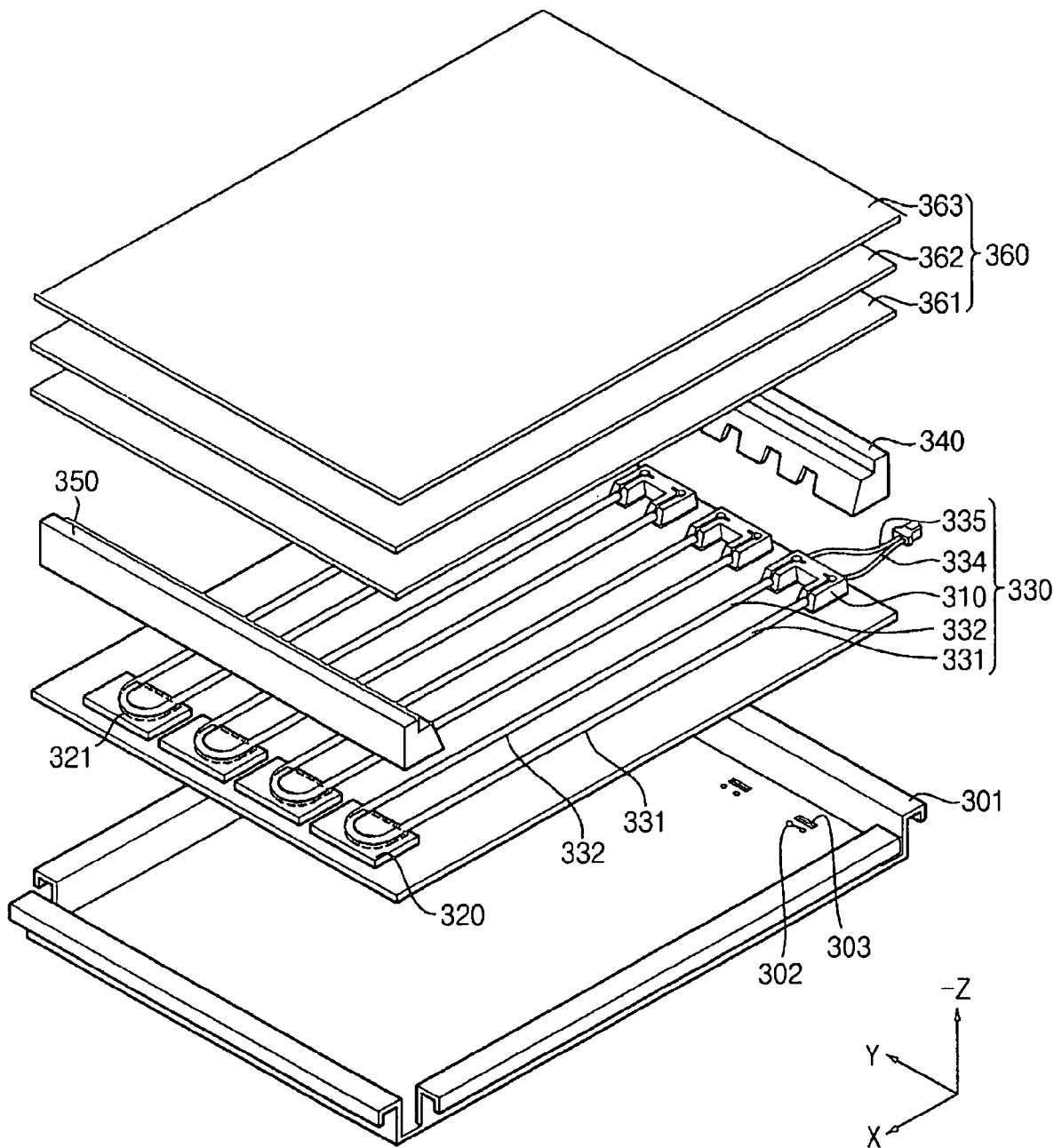
FIG. 14 is an exploded perspective view showing another exemplary embodiment of a backlight assembly in accordance with the present invention.

FIG. 14 is an exploded perspective view showing another exemplary embodiment of a backlight assembly in accordance with the present invention.

Referring to FIG. 14, the backlight assembly includes a receiving container 301, a reflecting plate 305, a lamp assembly 330, a first side mold 340, a second side mold 350 and an optical member 360.

The receiving container 301 includes a bottom plate and a plurality of sidewalls that protrude from sides of the bottom plate to form a receiving space. The reflecting plate 305, the lamp assembly 330, the first and second side molds 340 and 350 and the optical member 360 are received in the receiving container 301.

A plurality of apertures 302 is formed at the bottom plate to guide lamp wires of the lamp assembly 330 from an exterior through the receiving container 301. In addition, a plurality of fixing grooves 303 is formed at the bottom plate to fix lamp holders of the lamp assembly 330 to the receiving container 301.

The reflecting plate 305 is on the bottom plate of the receiving container 301 so that a light generated from the lamp assembly 330 is reflected from the reflecting plate 305. Alternatively, a highly reflective material may be coated on the bottom surface of the receiving container 301 so that the reflecting plate 305 may be omitted.

The lamp assembly 330 includes a first lamp holder 310, a plurality of lamps 331 and 332, a plurality of lamp wires 334 and 335 and a lamp fixing member 320.

The first lamp holder 310 holds end portions of the lamps 331 and 332, and guides the lamp wires that are electrically connected to electrodes of the lamps 331 and 332 from the exterior into the receiving container 301. The first lamp holder 310 of FIG. 13 is same as in FIG. 1. Thus, any further explanation will be omitted.

Each of the lamps 331 is joined with a corresponding lamp 332 to form a U-shape. The lamp holder 310 holds one end portion of each of the lamps 331 and 332, and the lamp fixing member 320 fixes the other end portion of each of the lamps 331 and 332. The lamp fixing member 320 in turn is secured to at least one of the reflecting plate 305 and/or the receiving container 301.

The lamp fixing member 320 receives the other end portion of each of the lamps 331 and 332, and fixes the other end portion of each of the lamps 331 and 332 to the receiving container 301. The other end portion of the lamps 331 and 332 is a bent portion of the U-shape. The lamp fixing member 320 has an inlet 321 having a slit shape, and the other end portion of each of the lamps 331 and 332 is inserted into the lamp fixing member 320 through the inlet 321 so that each of the lamps 331 and 332 is fixed to the receiving container 301. For example, the lamp fixing member 320 may include an elastic material such as rubber.

The first side mold 340 covers the first lamp holder 310 so that the optical member 360 that is on the first side mold 340 is spaced apart from the lamps 331 and 332 by a constant distance. The first side mold 340 of FIG. 14 is the same as in FIG. 5. Thus, any further explanation will be omitted.

The second side mold 350 covers the lamp fixing member 320 so that the optical member 360 that is on the second side mold 350 is spaced apart from the lamps 331 and 332 by the constant distance.

The optical member 360 includes a diffusion plate 361 and a plurality of brightness enhancement sheets 362 and 363. The diffusion plate 361 diffuses a light generated from the lamps 331 and 332 to increase a luminance uniformity.

The brightness enhancement sheets 362 and 363 are on the diffusion plate 361 to increase a luminance of the light that has passed through the diffusion plate 361 when viewed on a plane. Alternatively, a protecting sheet (not shown) may be on the brightness enhancement sheets 362 and 363 to protect the brightness enhancement sheets 362 and 363 from a heat or an impact.

Figure 15:
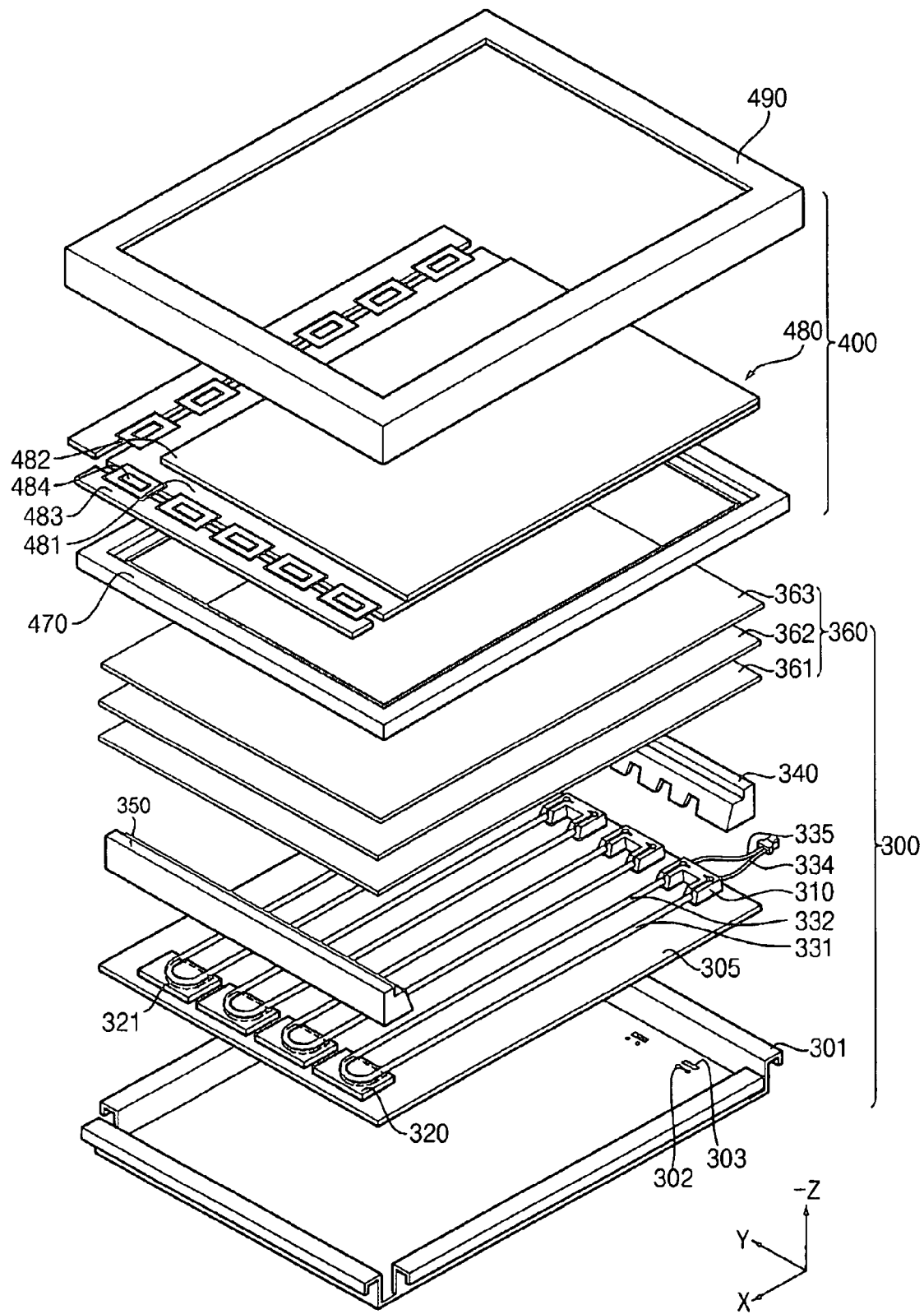
FIG. 15 is an exploded perspective view showing a display device having the backlight assembly shown in FIG. 14.

FIG. 15 is an exploded perspective view showing a display device having the backlight assembly shown in FIG. 14.

Referring to FIG. 15, the display device includes a backlight assembly 300 and a display assembly 400.

The backlight assembly 300 of FIG. 15 is same as in FIG. 14. Thus, the same reference numerals will be used to refer to the same or like parts as those described in FIG. 14 and any further explanation will be omitted.

The display assembly 400 includes a middle mold frame 470, a display panel 480 and a top chassis 490.

The middle mold frame 470 is received in the receiving container 301, and presses a peripheral portion of an optical member 360 that is on a first side mold 340 and a second side mold 350 to fix the optical member 360 to the receiving container 301.

The display panel 480 includes a first substrate 481, a second substrate 482, a liquid crystal layer (not shown), a printed circuit board 483 and a flexible circuit board 484.

The first substrate 481 includes a plurality of pixel electrodes, a plurality of thin film transistors TFT and a plurality of lines. The pixel electrodes are arranged in a matrix array. Each of the thin film transistors TFT applies a driving voltage to each of the pixel electrodes. The lines are electrically connected to the thin film transistors TFT.

Each pixel electrode includes a transparent conductive material. Examples of the transparent conductive material that can be used for the pixel electrodes include indium tin oxide (ITO), indium zinc oxide (IZO), amorphous indium tin oxide (a-ITO), etc.

The second substrate 482 corresponds to the first substrate 481. The second substrate 482 includes a common electrode and a color filter layer. The common electrode on the second substrate 482 corresponds to the pixel electrodes on the first substrate 481. The color filter includes red, green and blue color filter portions. The color filter portions correspond to respective pixel electrodes.

The liquid crystal layer (not shown) is interposed between the first and second substrates 481 and 482. Liquid crystals of the liquid crystal layer varies in arrangement in response to an electric field formed between the pixel electrodes and the common electrode, and thus a light transmittance of the liquid crystal layer is changed to display an image.

The printed circuit board 483 includes a driving circuit unit (not shown) for processing an image signal. The driving circuit unit (not shown) processes the image signal and a control signal to apply the image and control signals to the first and second substrates 481 and 483.

The flexible circuit board 484 applies driving signals to the thin film transistors TFT of the first substrate 481 based on the image and control signals that are from the printed circuit board 483. The driving signals include data and gate signals.

The top chassis 490 surrounds a peripheral portion of the display panel 480 to be combined with the receiving container 301. The top chassis 490 protects the display panel 480 from external impact. In addition, the top chassis 490 prevents drift of the display panel 480.

According to the present invention, the backlight assembly includes a lamp holder that extends in a longitudinal direction of a lamp to prevent the inflow of the impurities toward the central portion of the backlight assembly.

In addition, the lamp holder has a substantially trapezoidal cross-section so that the side mold is easily combined with the lamp holder.

The present invention has been described with reference to the exemplary embodiments. It is evident, however, that many alternative modifications and variations will be apparent to those having skill in the art in light of the foregoing description. Accordingly, the present invention embraces all such alternative modifications and variations as falling within the spirit and scope of the appended claims.

What is claimed is:

1. A lamp holder for a backlight assembly, the lamp holder comprising:
   a supporting part including a guiding hole extending therethrough for guiding a wire of a lamp of the backlight assembly; and
   a holding part protruding from the supporting part in a longitudinal direction of the lamp, a holding groove being formed at the holding part to hold an end portion of the lamp,
   wherein the holding part comprises a first holding portion protruding from a first end portion of the supporting part in the longitudinal direction of the lamp and a second holding portion protruding from a second end portion of the supporting part in the longitudinal direction of the lamp, and, wherein the guiding hole extending through the supporting part extends therethrough in a direction substantially transverse to the longitudinal direction of the lamp and a longitudinal direction of the supporting part, and wherein the supporting part is integrally formed with the holding part as an undivisible unit.

2. The lamp holder of claim 1, wherein each of the first and the second holding portions comprises:
    a first surface having an opening groove connected to the holding groove so that the end portion of the lamp is received in the holding groove through the opening groove; and
    a second surface connected to the first surface, an end portion of the holding groove being formed at the second surface.

3. The lamp holder of claim 2, wherein the second surface has a substantially trapezoidal shape.

4. The lamp holder of claim 1, wherein the holding part comprises an elastic synthetic resin.

5. A backlight assembly comprising:
    a lamp generating a light, an end portion of the lamp being electrically connected to a lamp wire;
    a lamp holder including:
        a supporting part including a guiding hole extending therethrough for guiding the lamp wire; and
        a holding part protruding from the supporting part in a longitudinal direction of the lamp, a holding groove being formed at the holding part to hold the end portion of the lamp;
    wherein the holding part comprises a first holding portion protruding from a first end portion of the supporting part in the longitudinal direction of the lamp and a second holding portion protruding from a second end portion of the supporting part in the longitudinal direction of the lamp; and
    an optical member disposed over the lamp to improve optical characteristics of the light; and
    a first side mold that covers the lamp holder and supports the optical member so that the lamp is spaced apart from the optical member by a constant distance,
    wherein the guiding hole extending through the supporting part extends therethrough in a direction substantially transverse to the longitudinal direction of the lamp and a longitudinal direction of the supporting part, and
    wherein the supporting part, is integrally formed with the holding part as an undivisible unit.

6. The backlight assembly of claim 5, wherein the holding part has a substantially trapezoidal cross-section.

7. The backlight assembly of claim 6, wherein the first side mold has an opening corresponding to the trapezoidal cross-section of the holding part.

8. The backlight assembly of claim 7, further comprising a receiving container combined with the lamp holder, and the supporting part further includes a fixing portion to fix the lamp holder to the receiving container.

9. The backlight assembly of claim 5, wherein the lamp comprises:
    a first end portion electrically connected to the lamp wire; and
    a second end portion that is a bent portion of the lamp having a u-shape.

10. The backlight assembly of claim 9, wherein the lamp holder holds the first end portion of the lamp.

11. The backlight assembly of claim 9, further comprising:
    a lamp fixing member that holds the second end portion of the lamp; and
    a second side mold that covers the lamp fixing member and supports the optical member so that the lamp is spaced apart from the optical member by the constant distance.

12. A display device comprising:
    a display panel that displays an image using a light; and
    a backlight assembly including:
        a lamp generating the light; and
        a lamp holder including:
            a supporting part including a guiding hole extending therethrough for guiding a lamp wire; and
            a holding part protruding from the supporting part in a longitudinal direction of the lamp, a holding groove being formed at the holding part to hold an end portion of the lamp,
        wherein the holding part comprises a first holding portion protruding from a first end portion of the supporting part in the longitudinal direction of the lamp and a second holding portion protruding from a second end portion of the supporting part in the longitudinal direction of the lamp, and
        wherein the guiding hole extending through the supporting part extends therethrough in a direction substantially transverse to the longitudinal direction of the lamp and a longitudinal direction of the supporting part; and
        a side mold that covers the lamp holder, and
            wherein the supporting part is integrally formed with the holding part as an undivisible unit.

13. The display device of claim 12, wherein the holding part has a substantially trapezoidal cross-section.

14. The display device of claim 13, wherein the side mold has an opening corresponding to the trapezoidal cross-section of the holding part.

15. The display device of claim 13, wherein the lamp comprises:
    a first end portion electrically connected to the lamp wire; and
    a second end portion that is a bent portion of the lamp having a u-shape.

16. The display device of claim 15, wherein the lamp holder holds the first end portion of the lamp.

17. The display device of claim 15, further comprising:
    a lamp fixing member that holds the second end portion of the lamp; and
    a second side mold that covers the lamp fixing member and supports the optical member so that the lamp is spaced apart from the optical member by the constant distance.

18. The display device of claim 12, further comprising an optical member between the lamp and the display panel, and the side mold includes a guide surface to receive the optical member.

* * * * *